R. VAMPILL.
WHEEL-HOE.
No. 181,380.  Patented Aug. 22, 1876.
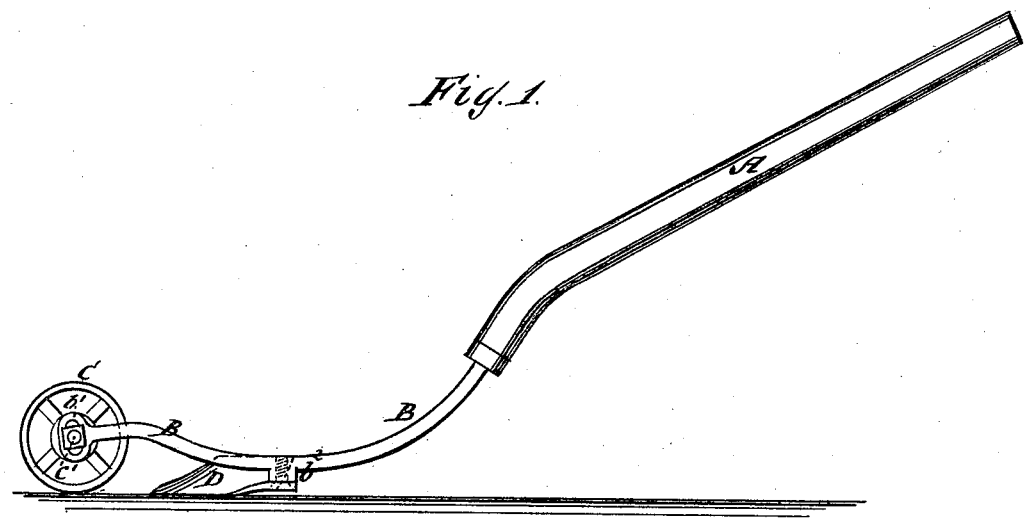
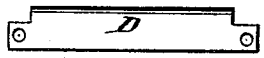
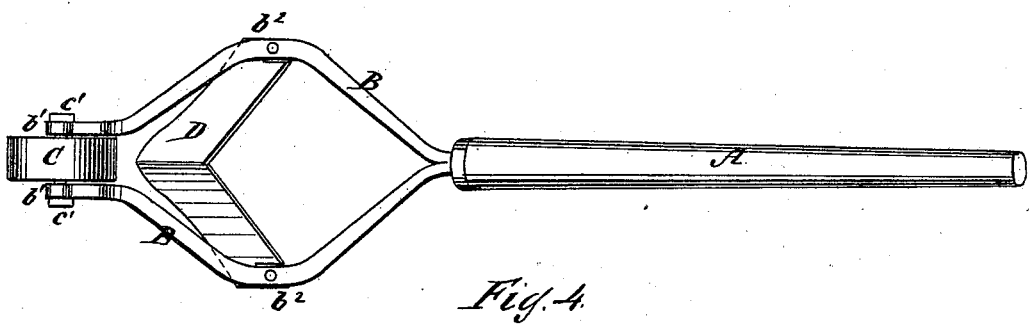
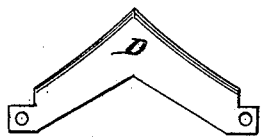
WITNESSES:
E. Wolff
John Goethals
INVENTOR:
R. Vampill
BY
ATTORNEYS.

UNITED STATES PATENT OFFICE.

RUDOLPH VAMPILL, OF MULLINS, SOUTH CAROLINA.

IMPROVEMENT IN WHEEL-HOES.

Specification forming part of Letters Patent No. 181,380, dated August 22, 1876; application filed July 22, 1876.

*To all whom it may concern:*

Be it known that I, RUDOLPH VAMPILL, M. D., of Mullins, county of Marion, and State of South Carolina, have invented a new and Improved Wheel-Hoe, of which the following is a specification:

Figure 1 is a side view of my improved hoe. Fig. 2 is a top view of the same. Figs. 3 and 4 are detail views of different hoe-plates or cutters.

The object of this invention is to furnish an improved hoe for destroying the weeds in walks, gardens, and other places, and which shall be simple in construction, convenient in use, and effective in operation.

The invention consists in an improved wheel-hoe, formed of the handle, the diamond-shaped frame provided with the slotted cross-head lugs, and the cutter-seat lugs, the wheel and its axle-bolt, and the knife or hoe-plate constructed and combined with each other, as hereinafter fully described.

Similar letters of reference indicate corresponding parts.

A is the handle, which may be of any desired length. The lower end of the handle A is strengthened by a ferrule, and to it is attached the frame B, which is made diamond-shaped. The frame B is open at its forward angle, and upon said ends are formed cross-head lugs $b^1$, which are slotted to receive the bolt $c'$, which serves as a journal or axle for the wheel C, so that by adjusting the said bolt $c'$, the wheel C may be raised and lowered to adjust the cutters to work at any desired depth in the ground. The face of the wheel C is made wide, to keep it from sinking into the ground. Upon the lower side of the side angles of the frame B are formed lugs $b^2$ to serve as seats for the ends of the cutters or hoe-plates D, which are secured detachably in said seats by screws or bolts. The hoe-plate D may be made in the form of a V-sweep, as shown in Figs. 1 and 2, or flat and straight, as shown in Fig. 3, or flat and V-shaped, as shown in Fig. 4.

Having thus described my invention, I claim as new and desire to secure by Letters Patent—

An improved wheel-hoe, formed of the handle A, the diamond-shaped frame B, provided with the slotted cross-head lugs $b^1$, and the cutter-seat lugs $b^2$, the wheel C and axle-bolt $c'$, and the knife D, constructed and combined with each other, substantially as herein shown and described.

RUDOLPH VAMPILL.

Witnesses:
   E. W. STOEBER,
   W. M. MAYNE.